Sept. 22, 1936.                L. FRIEDMANN ET AL                    2,054,900

SAFETY DEVICE FOR FLUID BRAKES

Filed Jan. 20, 1934

L. Friedmann
H. Deutsch
P. Jomek
G. Henrici & H. Etzelt
INVENTORS

By: Marks & Clerk
Attys.

Patented Sept. 22, 1936

2,054,900

UNITED STATES PATENT OFFICE 2,054,900

SAFETY DEVICE FOR FLUID BRAKES

Louis Friedmann, Hans Deutsch, Paul Jomek, Gustav Nemetz, and Heinrich Etzelt, Vienna, Austria, assignors to the firm Alex. Friedmann, Vienna, Austria Application January 20, 1934, Serial No. 707,586
In Austria February 16, 1933

3 Claims. (Cl. 303—84)

This invention relates to safety devices for hydraulic brakes, especially to devices arranged on vehicles, of the type in which an upwardly directed channel with a valve seat at its upper end is inserted into the pipe or pipes leading to the brake cylinder or cylinders and so located within the hydraulic distributing pipe system that, when the brakes are applied, a portion of the fluid will be moved within said channel. A valve member is, moreover, arranged within said channel and is carried within the same in an upward direction, when an upwardly directed flow of fluid occurs, the extent of said movement being however such, that the valve member will not reach the upper end of the channel where a seat for the valve is provided as long as the whole brake system is in good and regular order with no burst or leakage causing losses of fluid.

If, however, one of the pipes bursts or if a leak occurs within the pipe system or in one of the braking cylinders, the fluid movement upon application of the brakes towards the place where the leakage or burst has occurred, is such that it will carry the valve along the whole channel towards its upper end where the valve seat is provided. When seated the valve will close the pipe leading to that part of the hydraulic brake system in which the burst or leak has occurred and disconnect it entirely from the remainder of the brake system.

To realize this object constructions of a very complicated nature have been proposed, which comprise piston like valve members of a very complex character. These members must be provided themselves with openings or ducts which have to be controlled separately by valves. Constructions of this kind have the drawback that a relatively large pressure difference must exist between the two sides of the piston like member in order to move the same and therefore a movement of the piston is only obtained with relatively important leakages or bursts of the conduits or cylinders. The sensitivity of devices of this kind is, therefore, not a great one, as they react only in cases of the above described nature and this will also impair the reliability, as the driver of a vehicle provided with a safety device of the kind described can discover the defect only after the escape of a considerable amount of liquid. Moreover, with the constructions hitherto known each pipe to be guarded against leakage had to be provided with a separate safety device.

According to this invention, however, the arrangement is simplified to the greatest possible degree and the various disadvantages mentioned disappear when a ball is used as a valve member and arranged in an upwardly directed channel in such a manner that it fills only a part of a cross section through which the flow of fluid between the lower end of the upwardly directed channel and its upper end occurs. However, the clearance space between the ball and the walls of the channel itself in which it moves does not exceed a certain limit, so that when the brakes are applied the ball will be carried upwardly from the lower to the upper end of the channel without possibility of a failure and as experience has shown practically without any retardation. Moreover, a stop is provided for arresting the downward movement of the ball and for keeping it in a position of rest, which is so arranged or so located that a sufficient cross section for an unobstructed flow of fluid current is provided directed downwardly from the upper end of the channel towards its lower end, that is in the back direction whenever the brakes are released.

Thus it will be seen that the safety device according to this invention which comprises only a ball arranged in an upwardly directed channel will allow movement of the fluid during normal operation of the brake in both directions without any disturbance or inconvenience, and yet prevent any serious loss of fluid through leakage without failure.

According to one modification of the invention, which allows to reduce the normal stroke of the ball to be performed when the system is in regular working order as far as possible, the lower part of the channel is connected with its upper part not only by the channel itself, but also by a bye-pass branching off near the lower end of the channel from the pipe or duct leading thereto at a point ahead of the resting place of the ball, while the upper end of the bye-pass joins the upwardly directed channel at some point located ahead of the valve seat in the direction of flow to the brake cylinders. According to this modification, therefore, only part of the quantity of fluid, which is to be moved in this direction when the brakes are applied, is conveyed through the channel itself and therefore the ball will have to be lifted only to an extent which corresponds to that portion of the fluid, moved within the main channel during the normal condition of the brake system.

According to a modification of the invention the ball is arranged within a tube of a circular cross section which may be sharply bent or curved so as to adopt the shape of a V or U. One of the legs of the bent or curved tube constitutes the upwardly directed channel of the safety device, the upper end of which is provided with a seat for the valve ball; the lowest part of said tube, formed by the bent or curved portion, then constitutes a rest for the ball arresting its movement when it sinks downwardly within said channel by virtue of gravity, when the fluid is at rest. In this case the end of the channel which is provided with a valve seat is connected with the pipe or duct leading to a brake cylinder or to a group of brake cylinders. The end of the tube at the farther side is connected with the main cylinder or source of pressure of the system.

Also in a modification of the device of this type it is possible to arrange a by-pass between a point located ahead of the resting place of the valve ball at the bent or curved part in the direction of flow to the brake cylinder and some point in the upwardly directed channel within which the ball works, located ahead of the valve seat in the same direction of flow.

A further feature of this invention consists in a brake system wherein only a single arrangement of the type above described is necessary to act as a safety device for the various parts of a whole brake system. In this case according to this invention an arrangement with the downwardly bent V or U shaped tube is inserted between pipes leading from the main fluid cylinder or other source of pressure to the brake cylinders. In this case both legs of the downwardly bent U or V shaped tube are utilized as upwardly directed channels within which the ball may move. One of the pipes leading from the main fluid cylinder or other source of pressure is connected with one of the channels at a point between its upper end carrying the valve seat and the lower end forming the resting place of the ball, while the other pipe leading to another group of brake cylinders is connected with a similar point of the other channel forming the second leg of the bent tube. Both channels are provided with seats for the ball in this case and each of them is connected at the end carrying said seat with a pipe leading to a brake cylinder or group of cylinders, so that the braking fluid must flow through the opening surrounded by this valve seat from the main cylinder or other source of pressure to the brake cylinder or group of brake cylinders.

With this double safety device, when the whole fluid system is in regular order, so that no leakage occurs, the quantity of fluid, which is to be moved when the brakes are applied and which passes the lowest point of the channel where the ball is resting, is always equal to the difference between the quantity of fluid to be fed to one brake cylinder when the brakes are applied from the first moment until the moment when the brake blocks have closed up on the drums of one side, and the quantity fed to the brake cylinder of the other side for the same operation.

The movement of the ball is thus negligible if the system is in good working order and only if one of the pipes is not tight or if a burst or leakage occurs somewhere in the system a relatively large movement of the fluid will take place around the ball when the brakes are applied which will carry the ball upwards into one of the channels leading to that part of the system where the burst or leakage has occurred. The ball will then be pressed against the upper seat at this channel and will close or seal the passage. That part of the system which contains the pipe or cylinder where burst or leakage has occurred is thus entirely disconnected from the other system while the operation of the intact remainder of the braking system is not affected by this fact.

The invention is illustrated diagrammatically in the accompanying drawing.

Figure 3:
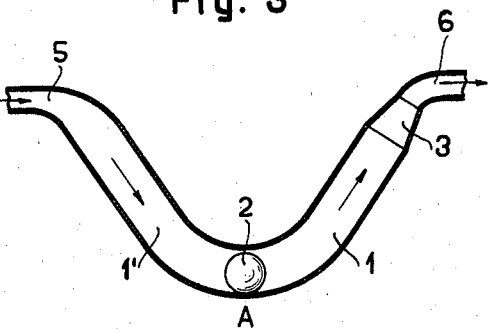
Figure 4:
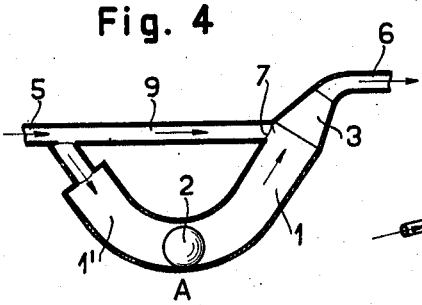
Figure 5:
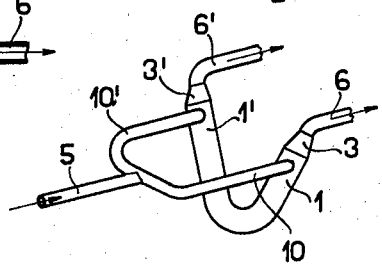

Figs. 3 to 5 diagrammatically show several modifications and modes of application of an arrangement with a bent channel of V or U shape. Fig. 3 illustrates a bent tubing with a valve ball of a smaller diameter than the channel itself, one of the legs of the tubing forming the upwardly directed channel, while Fig. 4 illustrates another modification with a by-pass leading from one part of the bent tube, located ahead of the resting place in the direction of flow to the brake cylinders, to the other leg forming the upwardly directed channel wherein the ball operates. Fig. 5 diagrammatically illustrates the utilization of the device in a brake system in such a manner that a single safety device is sufficient for the whole system.

Figures 6, 7:
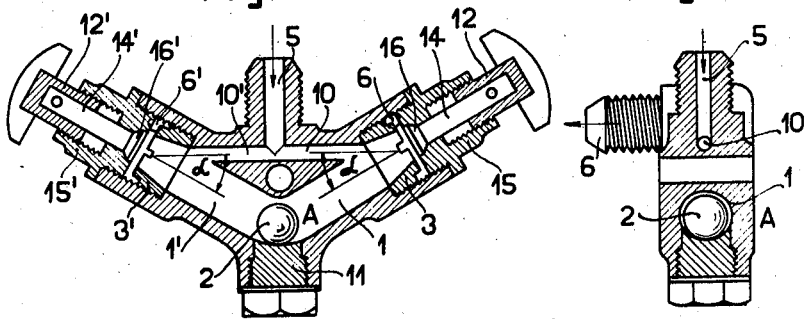
Figure 8:
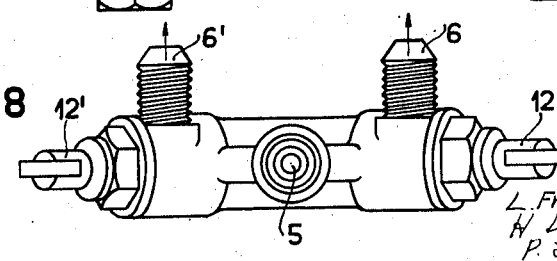

Figs. 6, 7 and 8 show a longitudinal, a cross section and a top view respectively of a constructional modification with a bent channel.

Like parts are designated throughout the specification by identical reference letters and the arrows within the channels or pipes are indicating the flow of the fluid to the brake cylinders, which occurs when the brakes are applied.

Figure 1:
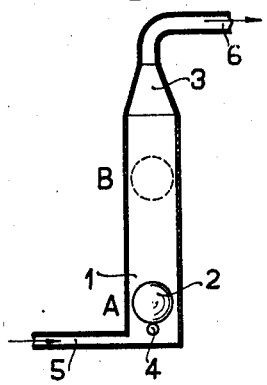
Fig. 1 shows a diagram of a safety device of a very simple form with an upwardly directed channel and a stop for the ball at the lower end of the channel.

In the diagram shown in Fig. 1 of the drawing, 1 designates an upwardly directed channel within which a ball 2 is located with a relatively large lateral play. At the upper end of the channel a valve seat 3 is arranged, which preferably is of conical form. At the lower end of the channel a stop 4 for the ball is provided which does not restrict the cross section of the upwardly directed channel and which supports the ball when returned to the lower part of the channel. Fluid will be allowed to pass around said ball by virtue of the clearance space which is left between it and the walls of the channel. The lower end of the channel is connected with the source of pressure of the whole system which generally consists in a cylinder called the main cylinder of the brake system. The upper part of the channel, however, is connected with a brake pipe 6 which is leading to a brake cylinder or a group of brake cylinders and the opening around which the seat 3 of the ball 2 is arranged forms the sole path through which fluid from the above mentioned main cylinder may enter into the pipe 6 and flow to the brake cylinders connected with it.

The operation of the arrangement described is the following:

When the brakes are applied, fluid will be conveyed under a certain pressure from the main cylinder through the pipe 5 at the lower end of the channel into the upwardly directed channel 1. When the whole system is in order and no leakage occurs this results in a movement of the fluid within the channel 1 which will carry the ball 2 from its lower position of rest A to an upper position which is marked B in Fig. 1. The position B is reached when the brake blocks or shoes are applied on the drums firmly so that the movement of the fluid within the brake cylinders ceases. The fluid within the channel 1 will then be again at rest and the ball will begin to sink slowly within the channel owing to its gravity.

When the brakes are released the brake cylinders will again shift the fluid back into the pipe 6 and the same quantity of fluid which has passed first from the lower to the upper end of the channel is now passing again in the reverse direction. The ball 2 is now seated upon the stop 4 or is carried downward until it reaches said member by the back flow of the fluid. The fluid flows around said ball 2 back to the main cylinder without any appreciable resistance through the clearance space left between said ball and the walls of the channels.

Thus it will be seen that when the brake system is in good condition and no leakage occurs the requisite movement of the fluid is not disturbed in any way by the safety device. If, however, the pipe 6 itself or one of the brake cylinders fed by said pipe 6 is not tight and if some leakage or burst has occurred the fluid will flow through channel 1 in the direction from the lower end to the upper end when the brakes are applied carrying the ball 2 upwards until it reaches the seat 3 and closes the passage leading from the channel at this seat. That part of the brake system in which the leak or burst has occurred is therefore sealed and is disconnected from the other parts of the system while the operation of the other parts of the system in which no leak has occurred continues without being affected thereby.

Figure 2:
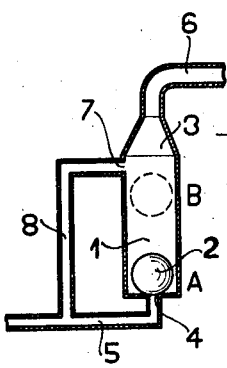
Fig. 2 shows a modification of the safety device with an upwardly directed channel and a by-pass leading from a point of the pipe connected with the lower end of the channel to a point of the upwardly directed channel located close to the seat for the valve ball at the upper end of the same.

In Fig. 2 another modification is illustrated in which a by-pass 8 branches off from pipe 5 which is leading to the lower part of the channel at a point located ahead of said lower end of the channel in the direction of flow to the brake cylinders. Said by-pass 8 is connected at its upper end with the channel 1 at a point 7 near the upper end of the channel but located ahead of the seat 3 in the direction of flow to the brake cylinders. In this case only part of the fluid which is conveyed to the brake cylinder when the brakes are applied is flowing through the channel 1 itself, so that the stroke of the ball is reduced. The channel 1 may accordingly also be reduced in length in view of this fact. Part of the fluid flowing to the brake cylinder is in this case flowing over the by-pass 8 directly from the lead 5 to the point 7 of the channel 1 and thus does not pass the channel itself. In this case the ball may seal the lower part of the channel 1 entirely. However, there may be also a pin or other contrivance for supporting the ball or the channel may have a bent portion with two legs arranged in the shape of a V or U.

The operation is practically the same as that described with respect to Fig. 1. In this case only the back flow of the fluid from the brake cylinder to the main cylinder when the brakes are loosened differs from that described in connection with Fig. 1 as such back flow passes partly or entirely through the by-pass 8. Therefore the ball 2 may even seal the lower opening of the channel when at its resting place if desired.

Fig. 3 shows another modification in which the channel is part of a U or V shaped tubing provided with a sharp or curved bend, so that two legs 1 and 1' with a lowest point between them are formed. A ball 2 is inserted into said channel with lateral play which by virtue of gravity will always roll down to the lowest point of the bent tube. One end of the channel 1 is provided with a seat 3 or with some restriction acting as a seat for the ball and this end is connected with the pipe 6 leading to the brake cylinder. The other leg 1' of the tube is connected with the pipe 5 leading from the main cylinder.

The operation of the device is the same as that described in connection with Fig. 1. The sole difference consists in the fact that when the brakes are loosened and when fluid is flowing back from the brake cylinder towards the main cylinder the ball resting in its lowermost position A at the beginning of the back flow is carried upwards in the channel 1' during the same. However, this movement of the ball 2 is not in any way disturbing to the movements of the parts or the operation when the brakes are actuated.

Also in the modification described in connection with Fig. 3 it may be of advantage to reduce the length of the legs of the bent tube and therefore as shown in Fig. 4 a by-pass 9 may be arranged which branches off at a point of pipe 5 leading from the main cylinder to the end of leg 1' to a point 7 in the upwardly directed channel 1 ahead of the valve seat 3 in the direction of flow to the brake cylinders.

Fig. 5 shows an application of the invention according to which one safety device is protecting a whole system and which therefore renders it unnecessary to provide a separate safety device for each fluid pipe leading to the brake cylinders. An arrangement of this kind is diagrammatically shown in Fig. 5. It consists in a safety device similar to that shown in Fig. 3 but inserted into the brake system in a special way. The pipe 5 leading from the main cylinder to the brake cylinders in this case has two separate branches 10 and 10' of which the branch 10 is connected with one of the legs 1 of the downwardly bent channel 1, 1', while the other branch 10' is connected with the other leg 1'. This connection is made at a place that is located above the lowermost point of the bent tube, but which is still below the end of said legs 1, 1' which are provided with the usual valve seats 3, 3'. The ends of said legs are moreover connected through openings surrounded by said seats 3, 3' with one of the brake pipes 6 and 6', respectively, each of said brake pipes leading to a separate brake cylinder or group of brake cylinders. Thus both legs of the V or U-shaped tube are utilized as a safety device. The arrangement according to Fig. 5 thus represents a double safety device in which two devices of the kind represented in Fig. 3 are combined.

There is however only one valve ball 2 which is operated by the difference of movement of the fluid quantities flowing through the two leads 6 and 6'. When the brake system is tight and no leakage occurs then the differences of fluid movement between the two branches 10, 10' and the pipes 6, 6' are negligible. When leakage occurs, however, for example in the pipe 6 or in a cylinder connected therewith, fluid will flow in large quantities to the place where the leakage occurs when the brakes are applied. Thus a large quantity of fluid will also flow over the lowest point of the channel 1, 1' where the ball 2 rests and the ball is carried upward by the quantity of fluid in the leg 1 until it reaches the seat 3 and closes the pipe 6 entirely. However, the other brake cylinders which are connected with the pipe 6' may be fully operative and are not disturbed in any way by the closing of the pipe 6. The same operation of course will take place when the leakage occurs at the other pipe.

Figs. 6, 7 and 8 finally show an example for the construction of a safety device such as that diagrammatically shown and explained with reference to Fig. 5. A central piece is provided with bores 1, 1' forming the two upwardly extended channels which are closed at their ends by stoppers 15, 15' screwed into their ends. In this central piece valve seats 3, 3' are secured which are of conical form. When the ball 2 is carried towards one of the seats it will adhere thereto by friction and will close the opening leading therethrough tightly. The central piece also contains a projection with a central bore 5 which may be connected to the pipe leading to the main cylinder. This bore leads to transversal branches 10, 10', the axes of which include an acute angle α with the axes of the legs 1, 1' of the channel. By virtue of this connection the flow which will occur when a leak or burst takes place through one of the legs of the channel 1, 1' and which presses the ball 2 towards its seats will be assisted and accelerated by the inflow of the fluid 5 through the branches 10, or 10'. In the lower part of the central piece there is an opening to be closed by a stopper 11 through which the ball may be introduced. This ball assumes a position A on said stopper when it is at rest. When the ball has been carried towards one of the seats 3, 3' when a leakage occurred it will stick to this seat by friction and will therefore have to be detached therefrom by external means. In order to dislodge the ball that is sticking to its seat the stoppers screwed into the ends of the channels carry central pins 14, 14', which may be moved by means of nuts 12, 12' secured within the stoppers 15, 15'. The pins thus will protrude when screwed down and will dislodge the ball 2 that is sticking against its seat 3. The pins 14, 14' are provided with conical parts 16, 16' at their ends facing the interior of the downwardly bent channel. If screwed out of the channel by means of the nuts 12, 12', they are forced against corresponding seats on the stoppers 15, 15'; thus the openings through which the pins are projecting into the interior are tightly sealed.

Lateral projections 6, 6' are provided by means of which the pipes leading to the brake cylinders may be connected with the central piece.

Further modifications, especially as regards the shape, the location or the number of the channels in which the ball is operating, may be made without departing from the invention.

What we claim is:

1. In a safety system for fluid brakes, especially for vehicles, with a source of pressure, pipes leading from the pressure source to brake cylinders, a safety device comprising a channel with two legs and a downwardly bent portion between them, inserted between the source of pressure and a brake cylinder or a group of brake cylinders, a ball within said channel of greater specific gravity than the fluid and of such size that a clearance space is left between it and the walls of the channel, said ball when at rest occupying the bent portion at the lowermost point of the channel with two legs by virtue of its gravity, each of the two legs of the channel being provided with a valve seat for the ball, said valve seat surrounding an opening connecting the source of pressure with a brake cylinder or a group of brake cylinders and each of said openings forming the sole communication by means of which the source of pressure is connected with the particular brake cylinder or group of brake cylinders, a pipe leading from said source of pressure to each leg of the channel, said pipe being connected with the channel at a point between said valve seat at the top part and the bent portion at the lowermost part thereof.

2. A safety device for fluid brakes, especially for vehicles, according to claim 1, wherein the communication leading from the source of pressure to the upwardly directed legs of the two legged channel, opening into said channel at a point between the seat for said ball and the position of rest for the same has the form of a duct arranged at an acute angle to the axis of the channel, and is discharging the fluid under such an angle, so as to assist the flow within said channel.

3. A safety device according to claim 1, wherein the ends of the channels are provided with pins capable of being projected through the valve openings into the interior of the channel thus detaching the ball from the valve seat when pressed against it and adhering thereto.

LOUIS FRIEDMANN.
HANS DEUTSCH.
PAUL JOMEK.
GUSTAV NEMETZ.
HEINRICH ETZELT.